United States Patent
Fitzpatrick et al.

(10) Patent No.: US 12,541,871 B2
(45) Date of Patent: Feb. 3, 2026

(54) SYSTEMS AND METHOD FOR REMOTE OBJECT MEASUREMENT

(71) Applicant: SURVEYING AND MAPPING, LLC, Austin, TX (US)

(72) Inventors: Bryan Fitzpatrick, Royse City, TX (US); Matt Thomas, Austin, TX (US); Nathan Xiques, Monroe, NC (US); Johnny Flores, Royse City, TX (US); Adam Long, Dripping Springs, TX (US); Yvonne Harding, Concord, NC (US); Luiz Cortes, Charlotte, NC (US)

( * ) Notice: Subject to any disclaimer, the term of this patent is extended or adjusted under 35 U.S.C. 154(b) by 609 days.

(21) Appl. No.: 17/677,629

(22) Filed: Feb. 22, 2022

(65) Prior Publication Data
US 2023/0267635 A1    Aug. 24, 2023

(51) Int. Cl.
*G06T 7/62* (2017.01)
*G06T 7/13* (2017.01)
*G06T 7/70* (2017.01)

(52) U.S. Cl.
CPC .......... *G06T 7/62* (2017.01); *G06T 7/13* (2017.01); *G06T 7/70* (2017.01)

(58) Field of Classification Search
CPC .... G06T 7/62; G06T 7/13; G06T 7/70; G06T 2207/10028; G06T 2207/10032; G06T 2207/30136; G06T 2207/30184; G06T 7/0006; G06T 7/60
See application file for complete search history.

(56) References Cited

U.S. PATENT DOCUMENTS

| | | |
|---|---|---|
| 6,853,327 B2 | 2/2005 | Miceli et al. |
| 9,519,014 B2 | 12/2016 | Aaserude et al. |
| 10,855,107 B2 | 12/2020 | Bliss et al. |
| 2011/0149089 A1* | 6/2011 | Yang ............... G06V 10/17 33/324 |
| 2012/0224052 A1* | 9/2012 | Bae ............... G01B 11/02 348/135 |

FOREIGN PATENT DOCUMENTS

CN    113781481 A  * 12/2021  ........... H04N 23/695

OTHER PUBLICATIONS

Lidar 101: An Introduction to Lidar Technology, Data, and Applications by Jamie Carter et al.; National Oceanic and Atmospheric Administration (NOAA) Coastal Services Center; 76 pages Nov. 2012.

* cited by examiner

*Primary Examiner* — Stephen R Koziol
*Assistant Examiner* — Michael Kim Maiden
(74) *Attorney, Agent, or Firm* — Jackson Walker LLP

(57) ABSTRACT

Various systems and processes may be used to achieve measurement of remote objects. In particular implementations, systems and processes for remote object measurement may include the ability to capture a digital image of an object to be measured and electronically sense the distance to the object to be measured. The systems and processes may also include the ability to electronically determine a size of the measured object and transmit the location, image, and determined size of the object to a remote server system.

36 Claims, 11 Drawing Sheets

SYSTEMS AND METHOD FOR REMOTE OBJECT MEASUREMENT

BACKGROUND

Remotely measuring the size of objects is useful where the objects are not easily accessible, whether for physical or safety reasons. Measuring the size of electrical transmission lines, for example, is required so that utility companies can determine the electrical capacity (commonly known as the ampacity) of their systems. However, the most common way to do this currently is to scale the poles/towers and use a mechanical device (e.g., a caliper) to measure the width of the wires. This is a high risk and time consuming job, especially for high voltage lines (e.g., 300 kV). Moreover, it is quite difficult, if not near impossible, to physically measure the size of transmission lines in the middle of spans between towers.

One solution for measuring objects remotely has been to use LiDAR, typically mounted on a vehicle. However, LiDAR does not produce highly precise results due to its resolution. Moreover, LiDAR tends to have refraction at the edges of objects, which also contributes to inaccuracy, especially when measuring smaller objects.

A further problem that may be encountered is that many objects that need to be measured are actually geographically remote. Electrical transmission lines, for example, often span hundreds of miles across rural land. Trying to move large equipment (e.g., trucks or cranes) to these locations to perform measurements is difficult and time consuming.

SUMMARY

Various systems and processes may be used to achieve remote object measurement. In particular implementations, systems and processes for remote object measurement may include the ability to capture a digital image of an object to be measured and electronically sense the distance to the object to be measured. The systems and processes may also include the ability to electronically determine a size of the measured object and transmit the location, image, and determined size of the object to a remote server system. Various implementation details and alternative configurations and procedures will be evident from the remainder of this disclosure.

In some implementations, a system for remote object measurement may include a passive imaging sensor, a ranger sensor, a location sensor computer system, a controller, and a network interface. The imaging sensor may be adapted to image an object to be measured, and the range sensor may be adapted to determine the distance to the object to be measured. The location sensor may be adapted to determine the present location of the imaging sensor, and the controller may be adapted to receive the image, the distance, and imaging sensor parameters and determine a size of the imaged object. The network interface may be adapted to send the location, image, and determined size of the object to a remote server system.

In certain implementations, the controller may be adapted to determine an image width of the object to determine the size of the object. The controller may, for example, be adapted to execute an edge detection routine to determine the image width of the object.

In some implementations, the controller may be adapted to execute an iterative routine to refine an approximation of the object size to determine the size of the object.

When the object being measured is an electrical transmission line, the controller may be adapted to determine the width of a strand of the transmission line and the number of strands on an outer surface of the transmission line.

The imaging sensor may have a view axis. And when an object being measured has a dimension that is oblique to the view axis, the controller is adapted to correct the determined size for the dimension being oblique.

In certain implementations, system may include an azimuth sensor and an elevation sensor. And the controller may be adapted to determine the location of the object being measured.

In some implementations, a process for remote object measurement may include capturing an image of an object to be measured via a passive imaging sensor and sensing the distance to the object to be measured. The process may also include electronically determining the location of the imaging sensor and electronically determining a size of the measured object. The process may also include transmitting the location, image, and determined size of the object to a remote server system.

In some implementations, electronically determining the size of the measured object may include determining the image width of the object. Determining the image width of the object may, for example, include executing an image processing routine to identify edges of the object.

Determining the size of the measured object may, for example, include electronically executing an iterative routine to refine an approximation of the object size.

If the object being measured is a transmission line, the process may further include electronically determining the width of a strand of the transmission line and the number of strands on an outer surface of the transmission line.

The imaging sensor may have a view axis. And the process may further include electronically correcting the determined size for an object being measured having a dimension that is oblique to the view axis.

The process may also include sensing the azimuth and elevation to the object being measured and electronically determining the location of the object being measured.

The described systems and process may have one or more or a variety of features. For example, in particular implementations, a system and a process may be useful for measuring objects that are difficult for humans to access, either due to their remoteness (e.g., electrical transmission lines) or the danger that surrounds them. Additionally, a system and a process may be able to provide corrections for object shapes and/or correct for obliquely oriented objects. A system and process may also be able to determine a location for the object being measured. A variety of other features will be evident to one skilled in the art from the following description and figures.

DETAILED DESCRIPTION

Figure 1:
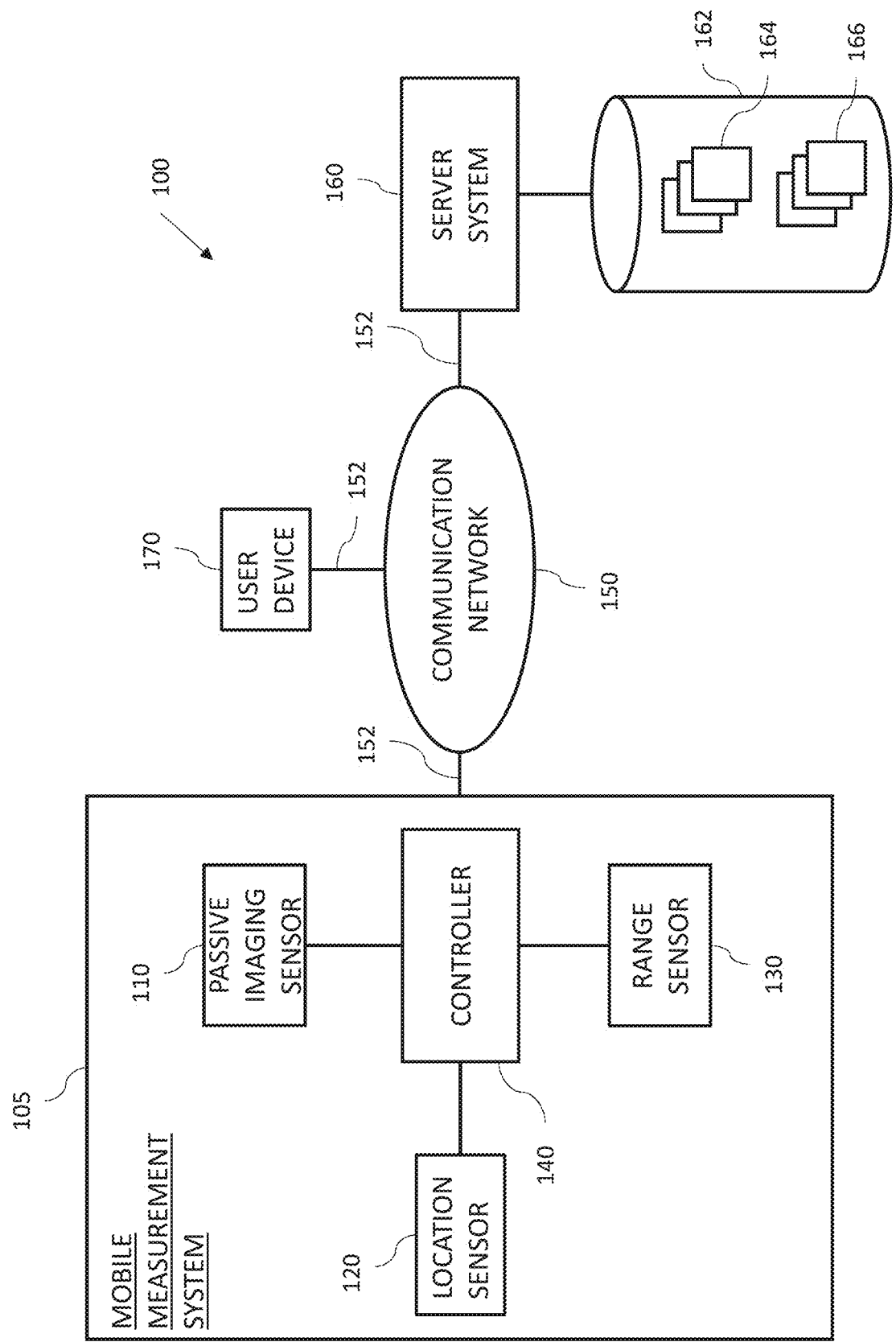
FIG. 1 is a block diagram illustrating selected components of an example system for remote object measurement.

FIG. 1 illustrates selected components of an example system 100 for measuring a remote object. At a high level, system 100 includes a mobile measurement system 105, a communication network 150, and a server system 160.

Figure 1A:
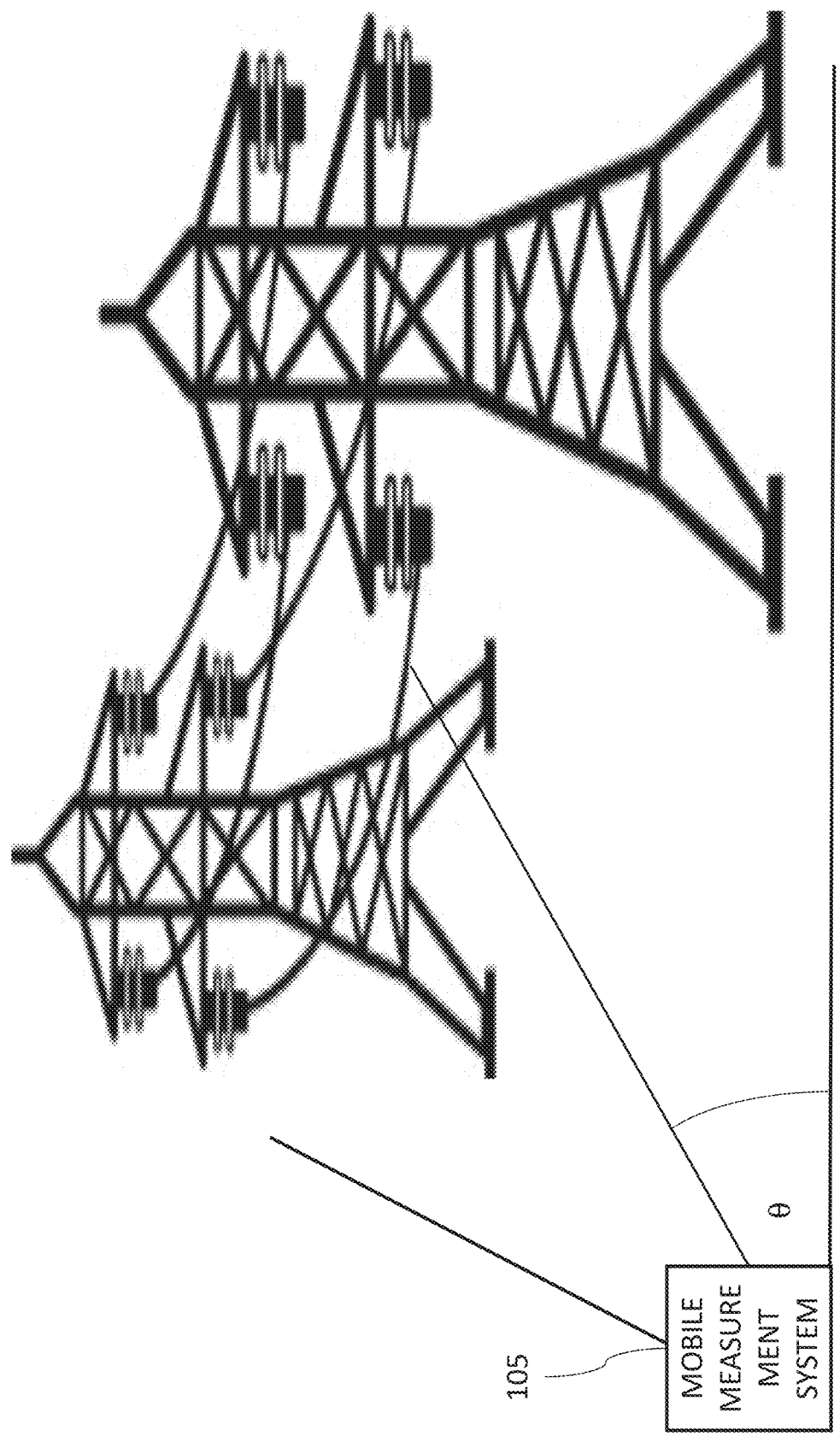
FIG. 1A is a line drawing illustrating an example use case for the system in FIG. 1.

A system such as system 100 may be useful for remotely measuring a variety of objects. For the purpose of illustration, however, system 100 will be discussed primarily in relation to measuring electrical transmission lines, an example of which is illustrated in FIG. 1A. But those of skill in the art will readily recognize the application of the systems and techniques discussed herein to remotely measuring other objects. For example, the system could be used to measure and validate steel and other structural members that are part of a lattice tower.

Mobile measurement system 105 is responsible for collecting the data required to measure the object and, in particular implications, determining the size of the object. Mobile measurement system 105 is at least transportable by vehicle (e.g., truck) to the measurement location. In certain implementations, mobile measurement system 105 may be hand portable. For instance, it may be mounted on a tripod. In particular, mobile measurement system 105 may be mounted on an aerial vehicle (e.g., a helicopter or unmanned aerial vehicle) from which the measurements may be made.

Mobile measurement system 105 includes a passive imaging sensor 110, a location sensor 120, a range sensor 130, and a controller 140. The sensors may be communicatively coupled to the controller by any appropriate technique to pass data thereto—for example, wireline (e.g., RS-232, RS-422, IEEE 1394, or USB) or wireless (e.g., WiFi or Bluetooth). In certain implementations, one or more sensors may not be communicatively coupled to the controller, instead requiring manual transfer of the data.

Passive imaging sensor 110 is responsible for capturing an optical image of the object to be measured. The imaging sensor may, for example, be a camera, such as a high resolution digital SLR (DSLR) camera. Example suitable cameras of this type that are currently available include the Sony A7R II or the Nikon D600. But other appropriate models, types of cameras, and/or imaging sensors may be used, whether now existing or later created. As a general example, resolutions between 30-60 megapixels with low distortion lenses having a focal length between 200-600 mm are thought to be appropriate for measuring electrical transmission lines at a range of about 100-300 ft (30-90 m). Typically, the distance to the object being measured should be such that the pixel size on the object to be measured is between 0.333 to 0.5 of the desired precision.

Location sensor 120 is responsible for determining the location of mobile measurement system 105. Location sensor 120 may, for example, be a satellite-based location sensor, such as for a Global Positioning System (GPS) sensor or a Global Navigation Satellite System (GLONASS) sensor, or a land-based sensor, such as for Long Range Navigation (LORAN). The location sensor may be a stand-alone sensor or integrated into another component of the mobile measurement system, such as controller 140. The location provided by location sensor 120 for mobile measurement system 105 may generally be treated as the location for any component of the mobile measurement system, and the location provided by location sensor 105 for a component of mobile measurement system may generally be treated as the location for mobile measure system 105 or any of its other components.

Range sensor 130 is responsible for determining the distance to the object to be measured. Ranger sensor 130 may, for example, be a laser ranger finder, such as the Nikon Forestry Pro II. In general, range sensors with an accuracy of one foot are thought to be useful for measuring electrical transmission lines. Given the range to the transmission lines (e.g., 30 m-80 m) and the small sizes being measured (e.g., 0.01-0.1 m), the range plays a small role in the accuracy of the measurements. Different range accuracies may be required for measuring other objects (e.g., larger objects or objects closer in proximity).

Controller 140 is responsible for receiving the data from the various sensors and determining a size for the object being measured. The controller may, for example, include one or more electronic processors to perform the determination. Controller 140 may, for example, be a smart phone or a digital tablet. In certain implementations, the controller may have location sensor 120 integrated therewith.

As one example of determining the size of an object, the width of a remotely imaged electrical transmission line may be determined. To determine the width of an electrical transmission line, an image acquired with imaging sensor 110 may be analyzed to determine the image size of the object (in camera pixels). In some implementations, for example, this may be derived directly from the image by the controller. In particular implementations, a user may have to define a region of interest in an image (e.g., using a graphical box on a display). This may, for example, occur if an image contains a large number of features.

An image analysis application may be used to determine the image size of the object being measured. For example, Adobe Photoshop or GNU Image Manipulation Program (GIMP) may be used to determine the number of pixels between two selected points. Custom applications could also be developed, in Windows on the .NET Core platform, for example. In general, the applications may count the camera pixels between two designated points. A more advanced version of this is discussed below.

Once the image size of the electrical transmission line has been determined, the parameters of the imaging sensor may be used to determine the image width of the object (e.g., in mm). For example, using the pixel width will allow the image width to be determined. And once the image width is known, the focal length of the imaging sensor, in combination with the range from the range sensor 130, may be used to determine an actual physical width. The parameters of the imaging sensor may be manually input, downloaded from the imaging sensor, or extracted from the image itself (e.g., from EXIF tags). In addition to focal length, pixel size, resolution, data such as date, time, location may be downloaded.

Once the image width of the electrical transmission line is known, the physical width of the electrical transmission line may be determined by scaling by the focal length and the range. As mentioned previously, the range is determined by the range sensor 130.

In particular implementations, the size of one dimension of an object can be determined, at least on an approximate basis, from the following equations:

Sensor Image Length=Number of Pixels×Pixel Size

Scale=Focal Length/Range; and

Object Size=Sensor Image Length/Scale.

For a Sony A7RII camera, for example, the sensor size is 35.9 mm×24 mm, with a maximum resolution of 7,952×5,304 pixels, giving a horizontal resolution of approximately 0.0045146 mm/pixel and a vertical resolution of approximately 0.0045249 mm/pixel. Thus, for a range of 101.3 feet and a focal length of 250 mm, an object that is 69 pixels in size is 1.514 inches in horizontal or 1.519 inches in vertical. The measurements of electrical transmission lines may, for example, generally have a precision of +0.05 inches (at a 95% confidence level) at up to 250 feet (76 m) away. In particular implementations, the range should be coupled with the imaging sensor parameters such that the pixel size on the object to be measured is 0.5 to 0.333 of the target precision (e.g., 0.05 in).

In particular implementations, an image analyzer (e.g., controller 140) may implement an edge detection technique to determine the edges of an object in an image. For certain types of backgrounds (e.g., low contrast) or objects that have fine features, the exact edges of an object can be difficult to determine (e.g., by sight), resulting in a loss of accuracy. To counter this, the controller may analyze the image using the edge detection technique.

For example, a Canny edge detection technique could be implemented. The Canny edge detection technique is composed of five basic operations:
  apply a Gaussian filter to smooth the image in order to remove noise;
  find the intensity gradients of the image;
  apply gradient magnitude thresholding or lower bound cut-off suppression get rid of spurious response to edge detection;
  apply double threshold to determine potential edges; and
  finalize the detection of edges by suppressing all the other edges that are weak and not connected to strong edges.
Other image processing techniques or manual digitization could also be used.

Once the edges of the object of interest have been determined, the image analyzer may determine the image width of the object (e.g., in mm), which can then be scaled. For example, the image analyzer could determine a best fit line for each of the detected edges and then determine the perpendicular camera pixel distance across the object being measured.

Figure 1C:
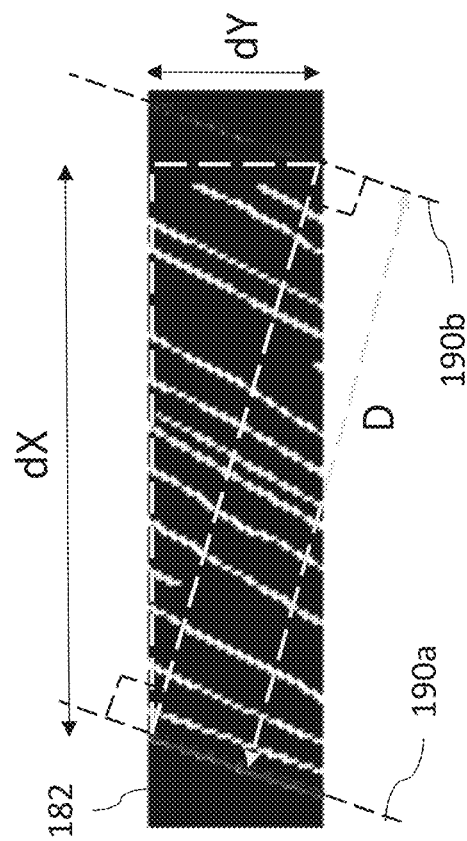
FIG. 1C is a line drawing illustrating measurement determination for a portion of the analyzed image in FIG. 1B.
Figure 1B:
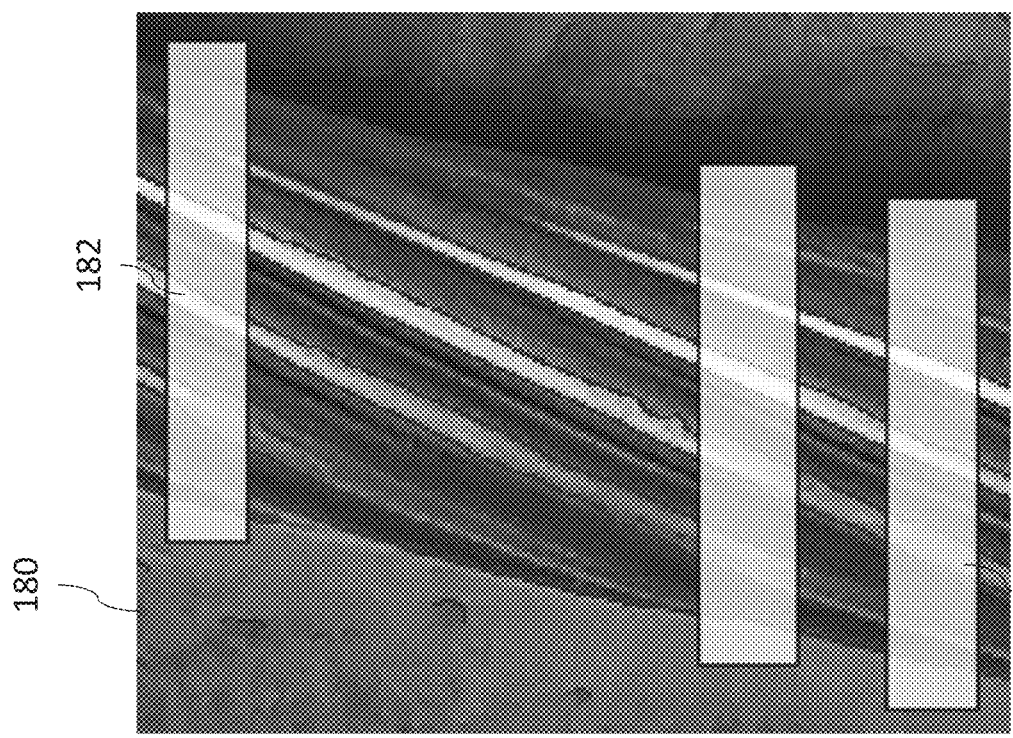
FIG. 1B is a line drawing illustrating an example image of a transmission line that has been analyzed by an edge detection technique.

FIG. 1B shows an example image 180 of a sample transmission line to which edge detection processing has been applied. Image 180 has multiple regions of interest 182, which, may, for example, have been designated by a user (e.g., in a graphical user interface).

FIG. 1C illustrates the processing to determine the width of the conductor in image 180. First, best fit lines 190 are determined for the outer edges of the transmission line. Then, the perpendicular distance between the lines (in camera pixels) may be determined. This may then be scaled to the actual measurement.

In particular implementations, this analysis may be repeated for every pixel point on the best fit lines for a region of interest 182. These results may then be averaged to determine the conductor diameter. In certain implementations, this analysis may be repeated for each region of interest 182, and the results averaged to determine the conductor diameter.

As noted previously, the accuracy of the imaging sensor is not necessarily the same in the horizontal and vertical directions. The controller may take into account which dimension (i.e., horizontal versus vertical) the object is being measured in and use the appropriate resolution. In certain implementations, like in FIG. 1C, the controller may take into account that the object is being measured in the horizontal and vertical dimensions (e.g., by determining the number of horizontal and vertical pixels across the object and accounting for the size differences therebetween).

Once the width of the electrical transmission line is determined, the controller may send the location, image, and width to server system 160 for storage and later retrieval. To send data to the server system 160, system 100 uses communication network 150. Communication network 150 may include one or more local area networks, wide area networks, and/or wireless networks. In particular implementations, communication network may include the Internet, a cellular phone network, and/or the PSTN.

Mobile measurement system 105 is communicatively coupled to communication network 150 by one of links 152. Links 152 may, for example, include a wireline link (e.g., copper or fiber optic) and/or a wireless link (e.g., cellular or WiFi).

Server system 160, which may be a single server or a collection of servers, whether co-located or remote, receives the data from controller 140 and places it in a storage 162, which may be co-located with the server system or remote. Storage 162 may, for example, be composed of a database and/or a file system. In the case of a database, for example, the data regarding the images (e.g., location, date, object size, etc.) may be stored in tables 164 in a database. And the images themselves may be stored in the database (e.g., as a binary large object (BLOB)) or in a file system, with file paths (e.g., pointers) in the database to the storage locations of the images 166.

The data in storage 162 may be retrieved by a user via a user device 170. User device 170 may, for example, be a desktop computer, a laptop computer, a tablet, or a smartphone. User device 170 may interact with server system 160 by entering into a client-server relationship with it. In particular implementations, the server system may perform at least some of the image processing and object size determinations, either in complementary fashion to controller 140 or to the exclusion of the controller.

As discussed, system 100 is useful for measuring objects that are difficult for humans to access, either due to their remoteness (e.g., electrical transmission lines) or the danger that surrounds them. System 100 may, however, also be useful for measuring most any type of object.

Although FIG. 1 illustrates one example system for remote object measurement, other systems for remote object measurement may include fewer, additional, and/or a different arrangement of components. For example, some systems may include a compass, from which azimuth angle to the object being measured may be detected. Using the azimuth angle, the location of the Earth's surface under the object being measured, as opposed to the location of the mobile measurement system, may be determined. Additionally, with the inclusion of the elevation angle to the object being measured, which could, for example, be available from the range sensor, the location of the object being measured could be determined.

As another example, a system could include a second mobile measurement system, which could work in concert with the illustrated one to measure an object. For example, for mobile measurement systems that do not include a range sensor, the angular measurements from the imaging sensors may be used in combination with the mobile measurement system locations to determine the size of the object being measured.

In particular implementations, determining the size of the object to the appropriate precision may require additional processing, whether by the controller or the server system. For instance, if the object is large and/or relatively close to the imaging sensor, the true sides of the object may not be captured.

Figure 2:
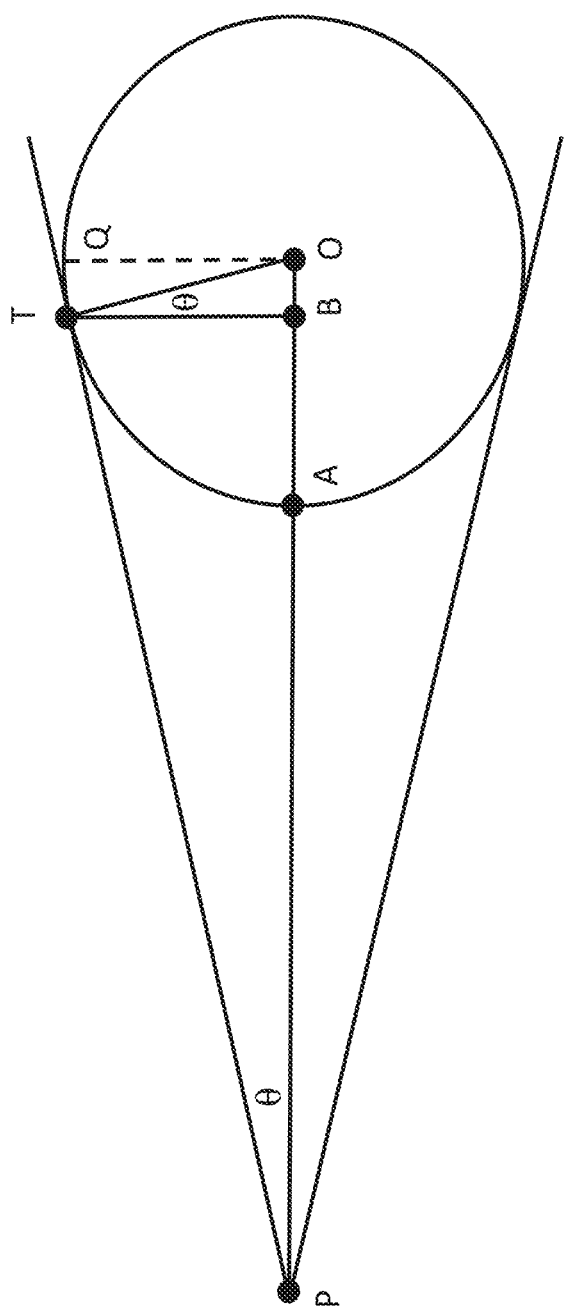
FIG. 2 is a line drawing illustrating an example geometry for remote object measurement.

Looking at FIG. 2, for example, when a round object is measured at a relatively close distance, the true sides of the object are not detected by the imaging sensor (i.e., T instead of Q). Moreover, the exact center of the object is not detected by the range sensor (i.e., A instead of O). Thus, an approximate dimension for OQ can be determined, but an exacting number may not be possible (e.g., within 0.05 inches). At long ranges (e.g., 200 feet), this may not make much difference when measuring small objects (e.g., the widths of electrical transmission lines). For electrical transmission lines, for instance, a correction factor of around 0.9999 has been determined. However, for larger objects or exacting measurements, a refinement of the estimate may be required.

To accomplish this, first note that OT is the same as OQ. Additionally, TB may be approximated as:

$$TB=PA\sin(\theta).$$

Of course, PA is only an approximation for PB. Additionally, TB is related to TO by:

$$TO=TB/\cos(\theta).$$

The angle θ, or at least a close approximation thereof, may be derived based on the pixel count (one-half the total) or the first equation. Now, having an approximation for TO, a computer system like controller 140 has an approximation for AO. And having an approximation for AO, the computer system can again determine θ using the larger triangle TPO since PO=PA+AO. The new θ will be slightly different than the original estimate and can be inserted back into the second equation above. The controller may continue to execute this process until only a small change results in the radius and diameters being determined. The change may, for example, be a percentage (e.g., 1%, 0.1%, 0.01%, etc.) or any other numerically expressible difference between the iterations.

Figure 3:
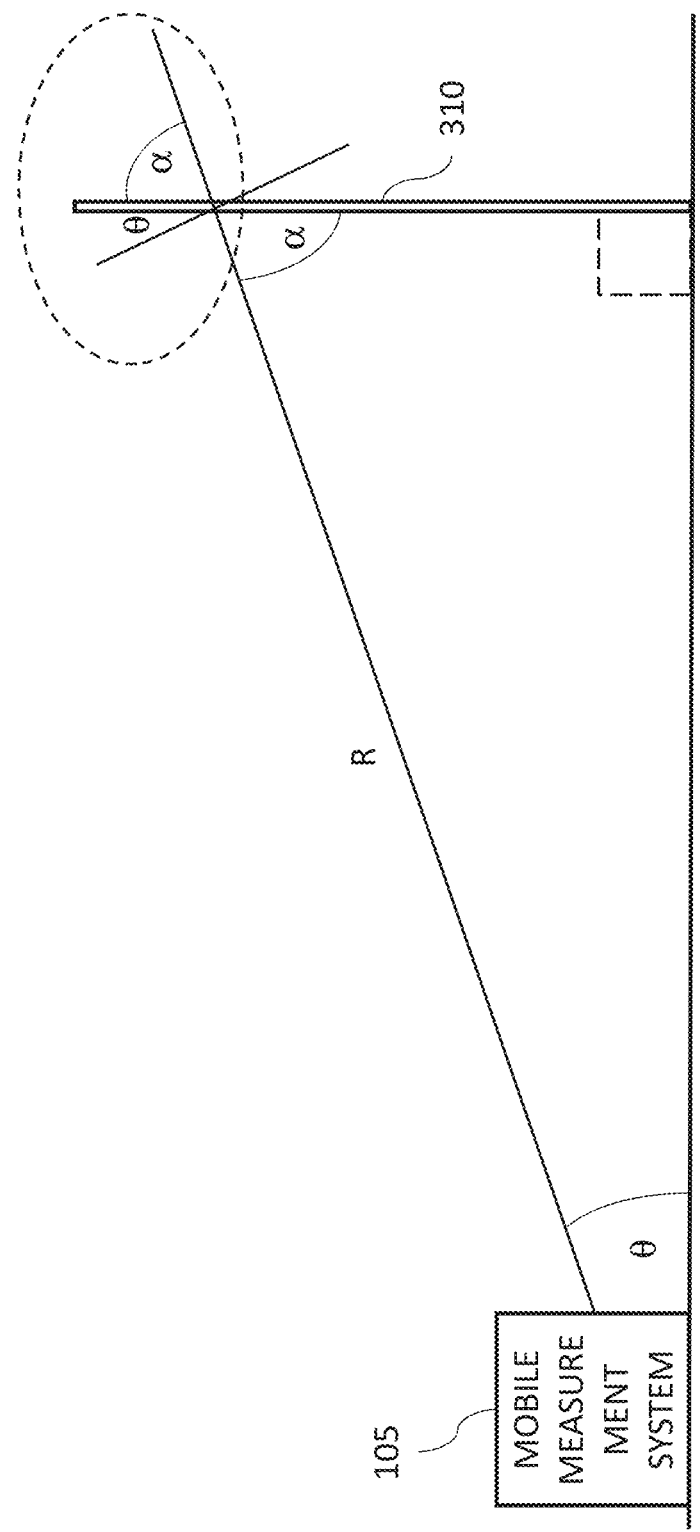
FIG. 3 is a line drawing illustrating another use case for the measurement system in FIG. 1.
Figure 3A:
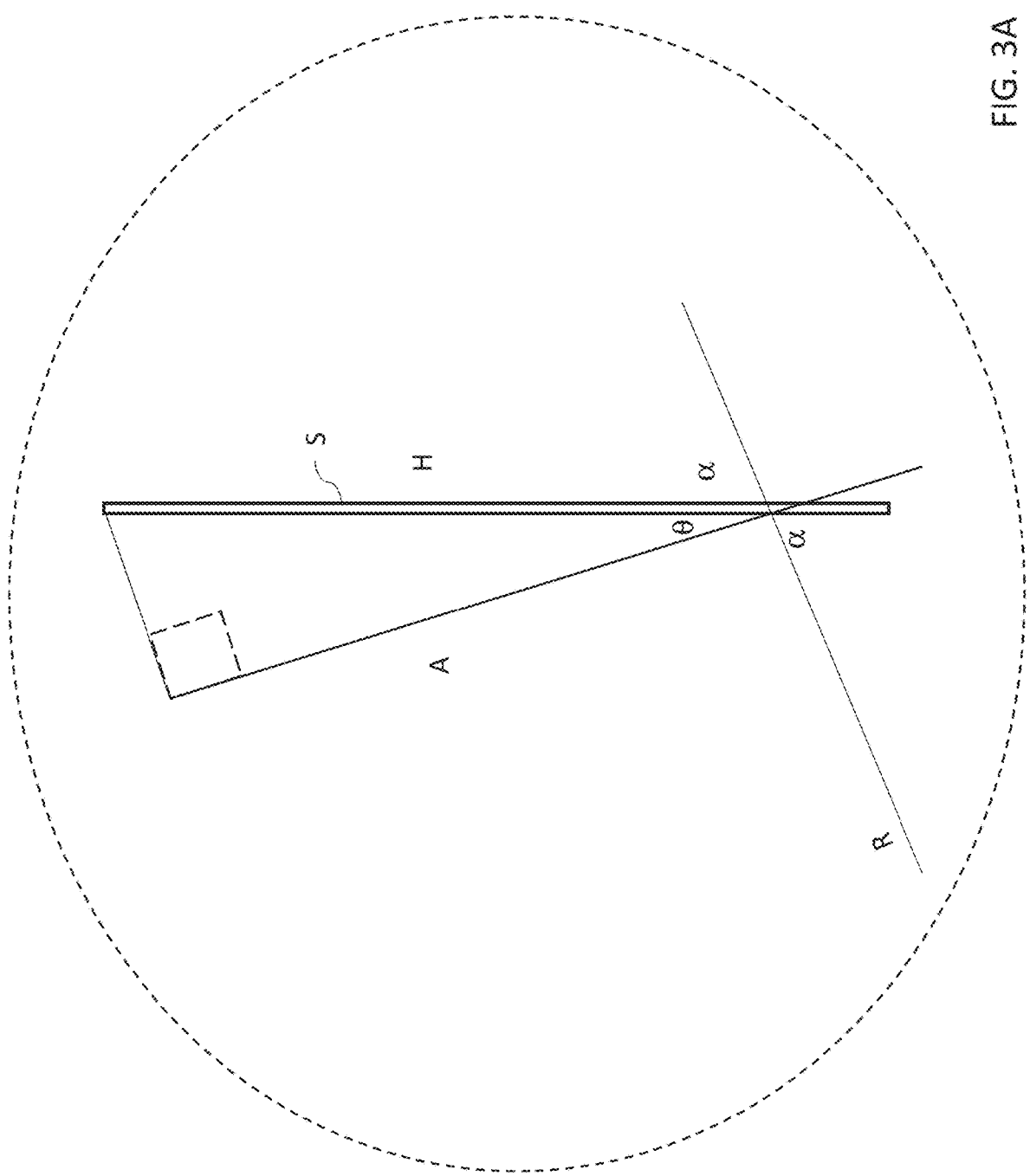
FIG. 3A is a line drawing highlighting a specific aspect of FIG. 3.

FIGS. 3-3A illustrate another example use case for remote measurement system 100. In this example, mobile measurement system 105 is measuring the vertical dimension of a tower 310—for an electrical transmission line, for example. FIG. 3 illustrates the overall system arrangement, and FIG. 3A illustrates the details of the measurement.

Figure 3B:
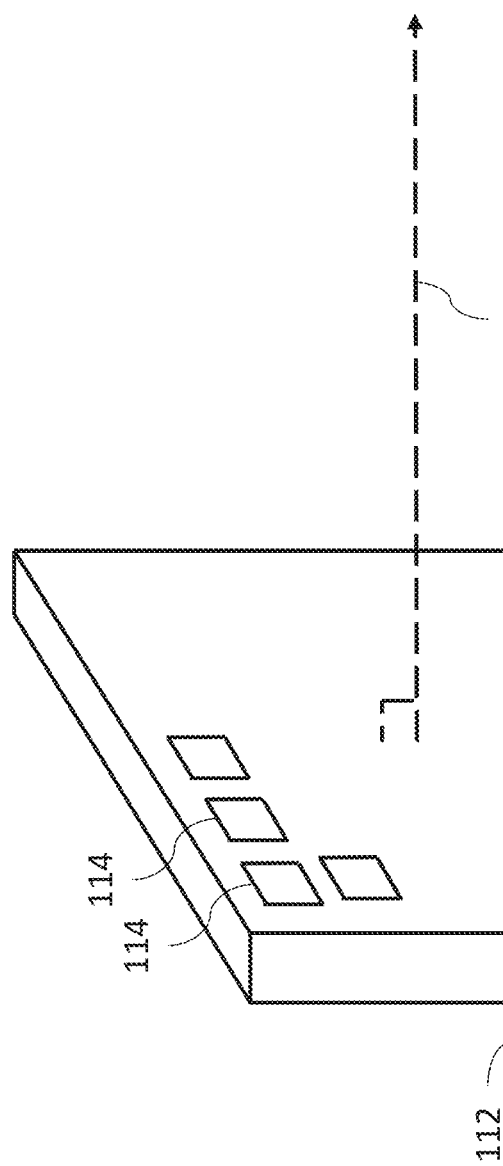
FIG. 3B is a line drawing illustrating an example imaging sensor component.

FIG. 3B illustrates an example imaging chip 112 for imaging sensor 110. As illustrated, imaging chip 112 is basically a substrate that has a number of sensing devices 114 (e.g., pixels) formed thereon. Sensing devices 114 may, for example, be charge-coupled devices or CMOS devices and are typically arranged in an array (e.g., a grid). Imaging chip 112 has a viewing axis VA that is normal to the array of sensing devices 114. Viewing axis VA is typically oriented along the range to the object being measured.

Using the techniques previously discussed regarding pixels occupied, pixel size, range, focal length, etc., a vertical dimension of an imaged section S of tower 310 can be determined, using the vertical dimension of the camera, for example. However, as can best be seen in FIG. 3A, the vertical dimension of the imaged section is actually oblique to the viewing axis of the imaging sensor, assuming it is along the range, by the elevation angle θ to the imaged section. Thus, this needs to be corrected to improve the accuracy of the measurement.

As can been seen more clearly in FIG. 3A, what is being measured is A, the vertical distance presented to be imaging sensor, but what is actually needed is H, the true height of the tower section S. As can be seen, H is related to A through the cosine of θ. Thus, dividing A by the cosine of θ will produce H. This, of course, assumes that the tower is perpendicular to the ground. If it is not, then the angle θ will need further adjustment.

The measurement correction technique illustrated by FIGS. 3-3A may also be applicable to a variety of other measurements. In general, any time the object being measured is oblique to imaging sensor, it may be refined by correcting for the angle that the measured is oblique in the dimension being measured.

Figure 4:
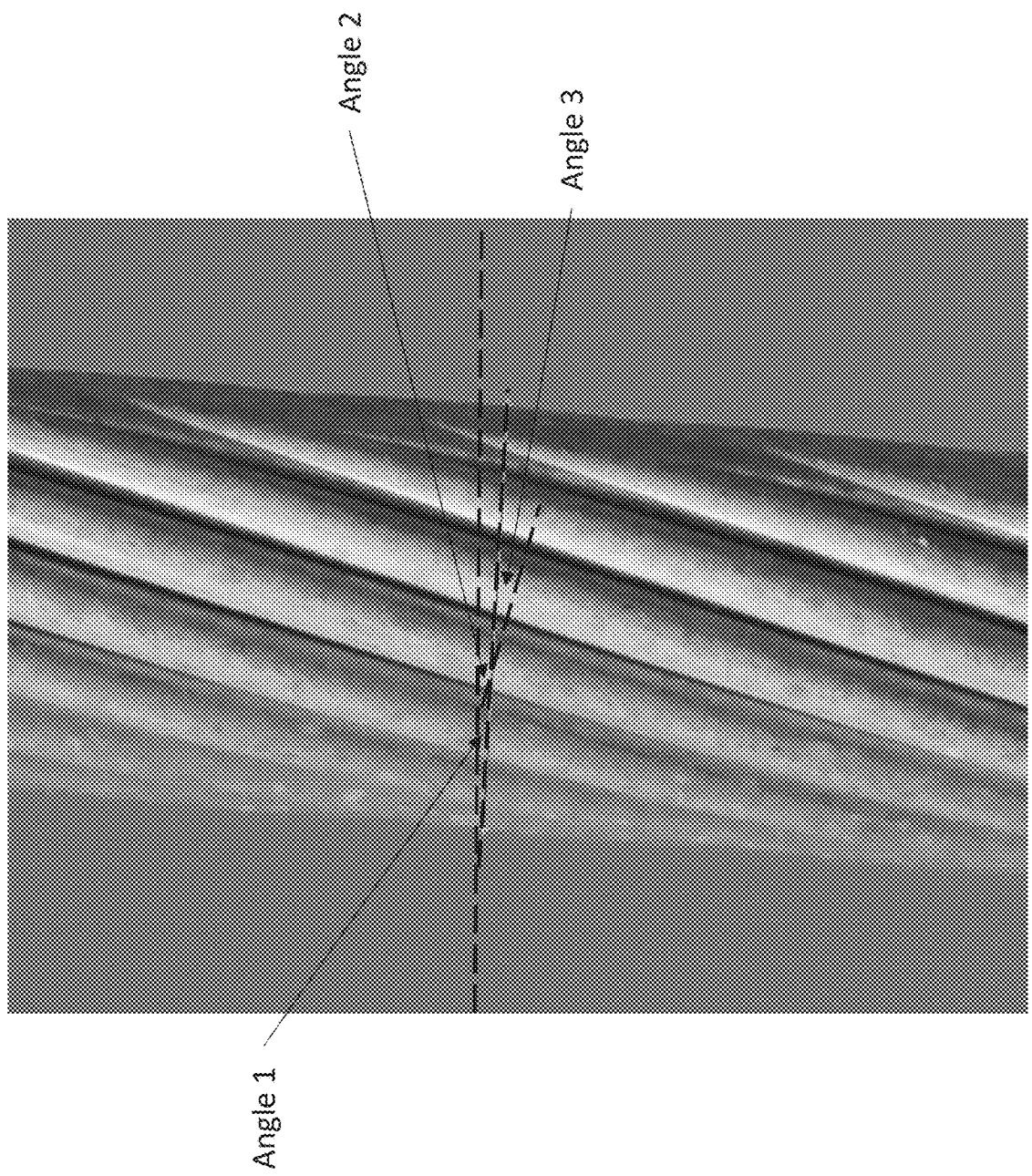
FIG. 4 is a line drawing illustrating another example use case for the system in FIG. 1.

In particular implementations for imaging within an image editing solution like Adobe Photoshop, an electrical transmission line, the number of strands in the outer shell of the transmission line may also be determined, by a computer system like controller 140, for example. FIG. 4 illustrates an example situation. The number of strands (SC) may be determined from the following:

$SC=(PI*CD)/(SD/\text{Cos}(\text{Angle}3))$, where $SD$=Strand Diameter $SH$=Strand Hypotenuse=$SD/[\text{Cos}(\text{Angle}3)]$ $CD$=Conductor Diameter Angle 1=Angle between image horizontal and conductor diameter Angle 2=Angle between image horizontal and strand diameter Angle 3=abs(Angle2)−abs(Angle1)

The image widths of the conductor diameter and the strand diameter may be determined, for example, using the image processing techniques discussed previously (e.g., edge detection, line fitting, pixel count determination, etc.). Then, the conductor diameter and the strand diameter may be determined by adjusting for the optics and range of the image. Once the conductor diameter and strand diameter are known, the number of strands in the outer shell may be determined using the first equation.

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

Figure 5:
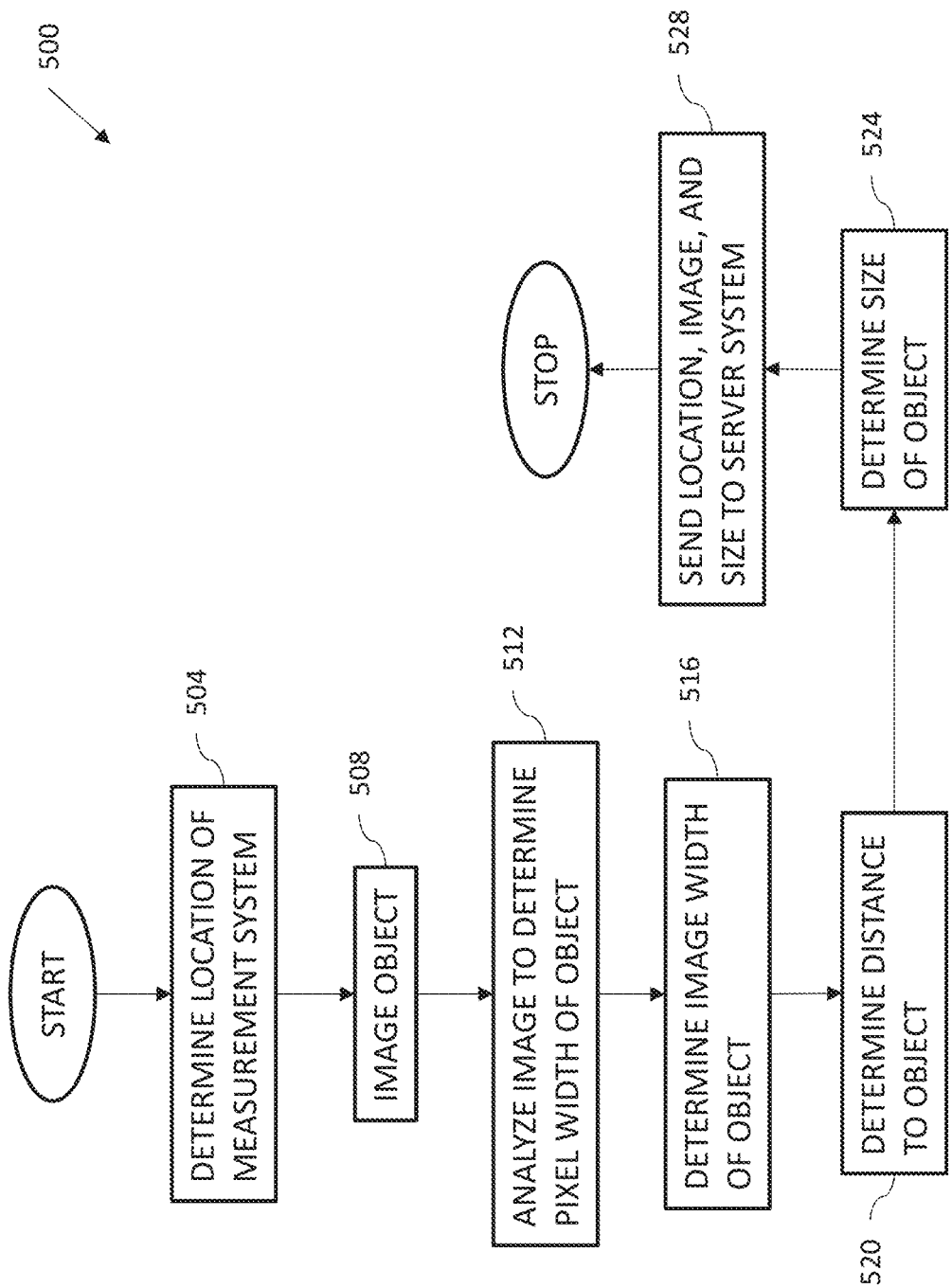
FIG. 5 is a flow diagram illustrating selected operations of an example process for remote object measurement.

FIG. 5 illustrates an example process 500 for remote object measurement. Process 500 may, for example, be implemented by a system similar to system 100.

Process 500 calls for determining the location of a mobile measurement system (operation 504). Determining the location of a mobile measurement system may, for example, include activating a location sensor (e.g., a GPS sensor) and determining the location based on the signals (e.g., RF) received.

Process 500 also calls for imaging the object to be measured (operation 508). The object to be imaged may, for example, be an electrical transmission line or any other appropriate object. Imaging the object may, for instance, be accomplished with a digital detector have a planar array of charge-coupled devices or CMOS devices. In particular implementations, the object is passively imaged.

Process 500 further calls for analyzing the image to determine the pixel width of the object (operation 512), the width being in the dimension being measured. The pixel width may, for example, be determined by analyzing the image to identify edges of the object (e.g., using a Canny edge detection technique) and then determining the number of pixels between the edges.

Once the pixel width of the object has been determined, process 500 calls for determining the image width of the object (operation 516). The image width of the object may, for example, be determined by combining the pixel width of the object with the size of the pixels in the imaging array, which may be determined from the size of the array and the number of pixels.

Process 500 additionally calls for determining the distance to the object being measured (operation 520). The distance (or range) to the object being measured may, for example, be determined using a laser range finder.

Process 500 also calls for determining the size of the object in the appropriate dimension (operation 524). The size of the object may, for example, be determined by adjusting the image width of the object by the optical properties of the imaging sensor (e.g., focal length) and the distance.

The location of the imaging system, the image, and the object size may then be sent from the mobile imaging system to a server system for storage and cataloging (operation 528).

Although FIG. 5 illustrates an example process for remote object measurement, other processes for remote object measurement may include fewer, additional, and/or a different arrangement of operations. For example, the distance to the object may generally be determined at any time prior to the size of the object being determined, and the location of the measurement system may be generally be determined at any time during the process. As another example, a process may include executing an iterative routine to refine the determined size of the object, especially if the object is larger relative to the distance. As an additional example, a process may include determining image properties of the imaging sensor. These may, for example, be downloaded from the imaging sensor and/or read from tags associated with the image. As a further example, a process may include determining the location of the object being measured. This may, for instance, be accomplished by adjusting the location of the mobile measurement system by the distance to the object being measured and its azimuth and/or elevation from the imaging and/or range sensor. As an additional example, some of the image processing techniques may be performed by the server system. A variety of operations may be performed in a contemporaneous or simultaneous manner.

Figure 6:
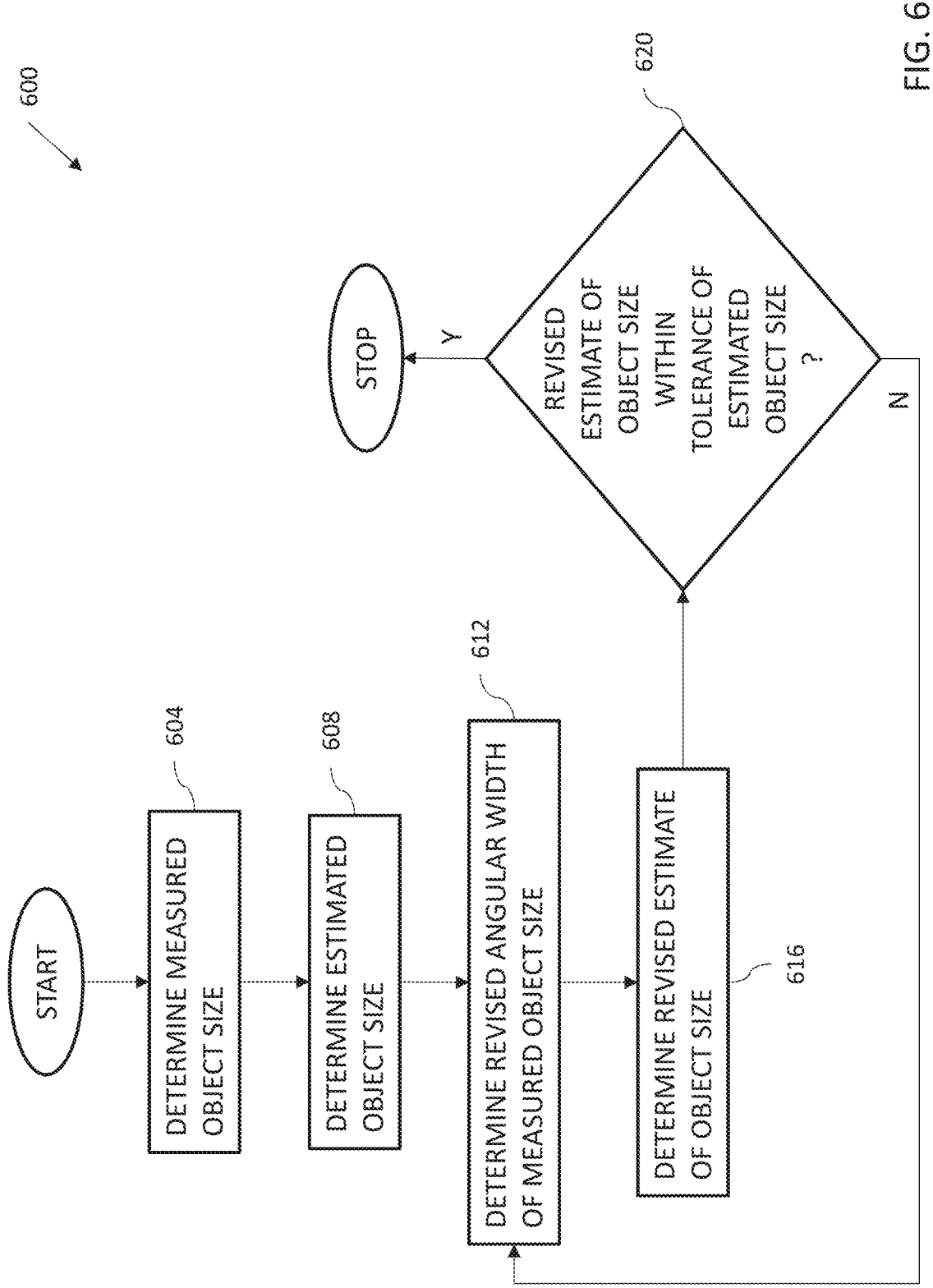
FIG. 6 is a flow diagram illustrating selected operations of an example process for improving remote object measurements.

FIG. 6 illustrates another example process 600 for remote object measurement. Process 600 may, for example, be implemented by a system similar to system 100.

Process 600 calls for determining a measured size of an object (operation 604). Determining the measured size of an object may, for example, be accomplished by a process similar to process 500. As discussed previously with respect to FIG. 2, however, the measured size of an object may not be its actual size.

Process 600 also calls for determining an estimated size for the object (operation 608). Determining the estimated size for the object may, for example, be accomplished by using the measured size for the object, the range to the front of the object, and the estimated object geometry (e.g., circular) to determine an estimated size.

Process 600 also calls for determining a revised angular width for the measured object size (operation 612). The revised angular width may, for example, be based on the estimated object size and the estimated object geometry.

Process 600 further calls for determining a revised estimate of the object size (operation 616). The revised estimate of the object size may be based on the revised angular size of the measured object size.

Process 600 also calls for determining whether the revised estimate of the object size is within tolerance of the estimated object size (operation 620). Determining whether the revised estimate of the object size is within tolerance of the estimated object size may, for example, be accomplished by comparing the difference between to two size and determining if it is within an acceptable tolerance (e.g., 1%, 0.1%, 0.01%, or 0.00%).

Although FIG. 6 illustrates an example process for remote object measurement, other processes for remote object measurement may include fewer, additional, and/or a different arrangement of operations. Moreover, a variety of operations may be performed in a contemporaneous or simultaneous manner.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

The flowcharts and block diagrams in the figures may illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alterative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems that perform the specified function or acts, or combinations of special purpose hardware and computer instructions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, .NET Core, C++, C #, or the like and conventional procedural programming languages, such as the "C" programming language or similar programming languages. The program code may execute entirely on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 7:
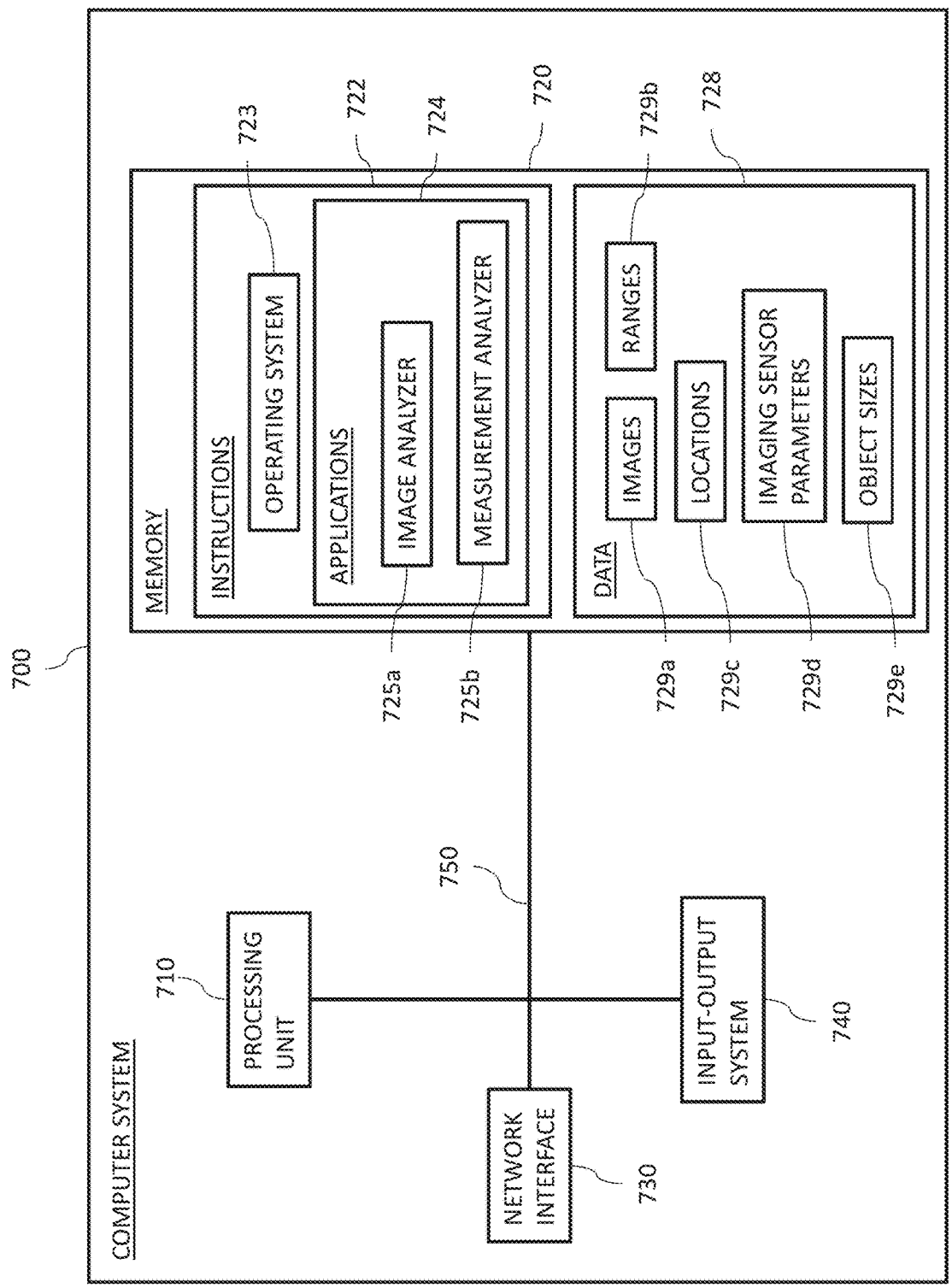
FIG. 7 is a block diagram illustrating selected components of an example computer system for remote object measurement.

FIG. 7 illustrates selected components of an example computer system 700 for performing remote object measurement. System 700 may, for example, be part of a local computer system (e.g., controller 140) or part of a remote computer system (e.g., server system 160). Among other things, computer system 700 includes a processing unit 710 and memory 720, which are coupled together by a network system 750.

Processing unit 710 may, for example, include one or more processors (e.g., microprocessors, microcontrollers, field-programmable gate arrays, or application specific integrated circuits). The processors could, for instance, operate according to reduced instruction set computer (RISC) or complex instruction set computer (CISC) principles. Processing unit 710 may operate according to instructions stored in memory 720 and/or encoded on processing unit 710 itself. In general, processing unit 710 may include any number of devices that can manipulate information in a logical manner.

Memory 720 may, for example, include random access memory (RAM), read-only memory (ROM), and/or disc memory. Various items may be stored in different portions of the memory at various times. Memory 720, in general, may be any combination of devices for storing information.

Memory 720 includes instructions 722 and data 728. Instructions 722 may include an operating system 723 (e.g., Windows, Linux, or Unix) and one or more applications 724. As illustrated, applications 724 include an image analyzer 725a and a measurement analyzer 725b, but may include other applications in other implementations.

Data 728 may include images 729a (e.g., taken of the objects to be measured), ranges 729b to the objects, measuring locations 729c (e.g., determined by a location sensor), imaging sensor parameters 729d (e.g., received from the imaging sensor), and objects sizes 729c (e.g., determined by the applications 724). Fewer and/or additional types of data may be included in other implementations.

Computer system 700 also includes an network interface 730 and an input-output system 740. Network interface 730 may include one or more communication interfaces to send data to and receive data from another computer system. A communication interface may, for instance, be a network interface card (whether wireline or wireless) or a modem (whether wireline or wireless). A communication interface may allow data exchange with a data network (e.g., the Internet or an Ethernet) or a phone network (e.g., a cellular network).

Input-output system 740 could include one or more user output devices and/or user input devices. User output devices could, for example, be a display, a speaker, or an indicator (e.g., a light). User input devices could, for example, be a keyboard, a keypad, a touchpad, a stylus, a mouse, or a microphone. Input-output system 740 could also include one or more ports, whether serial (e.g., RS-232, RS-422, USB, etc.) or parallel.

Network system 750 is responsible for communicating information between processing unit 710, memory 720, network interface 730, input-output system 740. Network system 750 may, for example, include a number of different types of busses (e.g., serial and parallel).

In certain modes of operation, computer system 700 receive one or more images 729*a*, ranges 729*b*, locations 729*c*, and imaging sensor parameters 729*d* through input-output system 740, and processing unit 710, according to instructions 722, may analyze one or more images 729*a* to determine the pixel image width of an object (e.g., in the dimension being measured), determine the image width of the object (e.g., based on pixel sizes of the imaging sensor), and determine a measured object size 729*e* (e.g., based on the image width of the object and the range and focal length of the imaging sensor). One or more types of data may be sent to a remote computer (e.g., a server system) through network interface 730.

Processing 710 unit may implement any of the other procedures discussed herein, to accomplish these operations.

Computer system 700 provides a variety of features. For example, the system may gather/receive the data to determine measurements for remote objects. The data may, for example, be received from sensors (e.g., image or range) or input by a user (e.g., imaging sensor parameters). The data may then be analyzed and a measurement accurately determined.

It should be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a computer system may include any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, Cloud Services such as Amazon, Azure, and Google and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disk and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms. Furthermore, various additions, omissions, substitutions, and changes in the form of the methods and systems described herein will be readily apparent to those skilled in the art while still achieving remote object measurement. Thus, the scope of protected subject matter should be judged based on the following claims, which may encompass one or more aspects of one or more embodiments.

The invention claimed is:

1. A mobile system for remote object measurement, the system comprising:
   a passive imaging sensor adapted to image an object to be measured;
   a range sensor adapted to determine the distance from the mobile system to the object to be measured;
   a location sensor adapted to determine the present location of the imaging sensor;
   a controller comprising an electronic processor, the controller adapted to receive the image, the distance, and imaging sensor parameters and determine a size of the object to be measured;
   wherein the object to be measured is an electrical transmission line, and the controller is adapted to determine the width of a strand of the transmission line and the number of strands on an outer surface of the transmission line; and
   a network interface comprising a communication interface, the network interface adapted to send the location, image, and determined size of the object to be measured to a remote server system.

2. The system of claim 1, wherein the controller is adapted to determine an image width of the object to be measured to determine a size of the object.

3. The system of claim 2, wherein the controller is adapted to execute an edge detection routine to determine an image width of the object to be measured.

4. The system of claim 1, wherein the controller is adapted to execute an iterative routine to refine an approximation of the object size to determine a size of the object to be measured.

5. The system of claim 1, wherein the imaging sensor has a view axis, and the controller is adapted to correct the determined object size for a dimension of the object to be measured being oblique to the view axis.

6. The system of claim 1, wherein the system comprises an azimuth sensor and an elevation sensor, and the controller is adapted to determine the location of the object to be measured.

7. A method for remote object measurement, the method comprising:
   capturing an image of an object to be measured via a passive imaging sensor;
   sensing the distance from the passive imaging sensor to the object to be measured;
   electronically determining the location of the imaging sensor;
   electronically determining a size of the object to be measured based on the image, the distance, and imaging sensor parameters; and
   transmitting the location, image, and determined size of the object to be measured to a remote server system;
   wherein the object to be measured is an electrical transmission line, and further comprising electronically determining the width of a strand of the transmission line and the number of strands on an outer surface of the transmission line.

8. The method of claim 7, wherein electronically determining a size of the object to be measured comprises determining an image width of the object to be measured.

9. The method of claim 8, wherein determining an image width of the object to be measured comprises executing an image processing routine to identify edges of the object to be measured.

10. The method of claim 7, wherein electronically determining a size of the object to be measured comprises executing an iterative routine to refine an approximation of the object size.

11. The method of claim 7, wherein the imaging sensor has a view axis, and further comprising electronically correcting the determined object size for a dimension of the object to be measured being oblique to the view axis.

12. The method of claim 7, further comprising sensing the azimuth and elevation of the object to be measured and electronically determining the location of the object to be measured.

13. A mobile system for remote object measurement, the system comprising:
   a passive imaging sensor adapted to image an object to be measured;
   a range sensor adapted to determine the distance from the mobile system to the object to be measured;
   a location sensor adapted to determine the present location of the imaging sensor;
   a controller comprising an electronic processor, the controller adapted to receive the image, the distance, and imaging sensor parameters and determine a size of the object to be measured;
   wherein the controller is adapted to execute an iterative routine to refine an approximation of the object size to determine a size of the object to be measured; and
   a network interface comprising a communication interface, the network interface adapted to send the location, image, and determined size of the object to be measured to a remote server system.

14. The system of claim 13, wherein the controller is adapted to determine an image width of the object to be measured to determine a size of the object.

15. The system of claim 14, wherein the controller is adapted to execute an edge detection routine to determine an image width of the object to be measured.

16. The system of claim 13, wherein the object to be measured is an electrical transmission line, and the controller is adapted to determine the width of a strand of the transmission line and the number of strands on an outer surface of the transmission line.

17. The system of claim 13, wherein the imaging sensor has a view axis, and the controller is adapted to correct the determined object size for a dimension of the object to be measured being oblique to the view axis.

18. The system of claim 13, wherein the system comprises an azimuth sensor and an elevation sensor, and the controller is adapted to determine the location of the object to be measured.

19. A method for remote object measurement, the method comprising:
   capturing an image of an object to be measured via a passive imaging sensor;

sensing the distance from the passive imaging sensor to the object to be measured;

electronically determining the location of the imaging sensor;

electronically determining a size of the object to be measured based on the image, the distance, and imaging sensor parameters;

wherein electronically determining a size of the object to be measured comprises executing an iterative routine to refine an approximation of the object size; and transmitting the location, image, and determined size of the object to be measured to a remote server system.

20. The method of claim 19, wherein electronically determining a size of the object to be measured comprises determining an image width of the object to be measured.

21. The method of claim 20, wherein determining an image width of the object to be measure comprises executing an image processing routine to identify edges of the object to be measured.

22. The method of claim 19, wherein the object to be measured is an electrical transmission line, and further comprising electronically determining the width of a strand of the transmission line and the number of strands on an outer surface of the transmission line.

23. The method of claim 19, wherein the imaging sensor has a view axis, and further comprising electronically correcting the determined object size for a dimension of the object to be measured being oblique to the view axis.

24. The method of claim 19, further comprising sensing the azimuth and elevation of the object to be measured and electronically determining the location of the object to be measured.

25. A mobile system for remote object measurement, the system comprising:
- a passive imaging sensor adapted to image an object to be measured;
- a range sensor adapted to determine the distance from the mobile system to the object to be measured;
- a location sensor adapted to determine the present location of the imaging sensor;
- a controller comprising an electronic processor, the controller adapted to receive the image, the distance, and imaging sensor parameters and determine a size of the object to be measured; and
- a network interface comprising a communication interface, the network interface adapted to send the location, image, and determined size of the object to be measured to a remote server system;
- wherein the imaging sensor has a view axis, and the controller is adapted to correct the determined object size for a dimension of the object to be measured being oblique to the view axis.

26. The system of claim 25, wherein the controller is adapted to determine an image width of the object to be measured to determine a size of the object to be measured.

27. The system of claim 26, wherein the controller is adapted to execute an edge detection routine to determine an image width of the object to be measured.

28. The system of claim 25, wherein the object to be measured is an electrical transmission line, and the controller is adapted to determine the width of a strand of the transmission line and the number of strands on an outer surface of the transmission line.

29. The system of claim 25, wherein the controller is adapted to execute an iterative routine to refine an approximation of the object size to determine a size of the object to be measured.

30. The system of claim 25, wherein the system comprises an azimuth sensor and an elevation sensor, and the controller is adapted to determine the location of the object to be measured.

31. A method for remote object measurement, the method comprising:
- capturing an image of an object to be measured via a passive imaging sensor;
- sensing the distance from the passive imaging sensor to the object to be measured;
- electronically determining the location of the imaging sensor;
- electronically determining a size of the object to be measured based on the image, the distance, and imaging sensor parameters; and
- transmitting the location, image, and determined size of the object to be measured to a remote server system;
- wherein the imaging sensor has a view axis, and further comprising electronically correcting the determined object size for a dimension of the object to be measured being oblique to the view axis.

32. The method of claim 31, wherein electronically determining a size of the object to be measured comprises determining an image width of the object to be measured.

33. The method of claim 32, wherein determining an image width of the object to be measured comprises executing an image processing routine to identify edges of the object to be measured.

34. The method of claim 31, wherein the object to be measured is an electrical transmission line, and further comprising electronically determining the width of a strand of the transmission line and the number of strands on an outer surface of the transmission line.

35. The method of claim 31, wherein electronically determining a size of the object to be measured comprises executing an iterative routine to refine an approximation of the object size.

36. The method of claim 31, further comprising sensing the azimuth and elevation of the object to be measured and electronically determining the location of the object to be measured.

* * * * *